United States Patent [19]

Miyajima

[11] Patent Number: 4,805,994
[45] Date of Patent: Feb. 21, 1989

[54] MATRIX DRIVE LIQUID CRYSTAL DISPLAY DEVICE WITH HIGH HORIZONTAL RESOLUTION AND LOW DUTY RATIO

[75] Inventor: Akira Miyajima, Hoya, Japan

[73] Assignee: Citizen Watch Co., Ltd., Tokyo, Japan

[21] Appl. No.: 183,492

[22] Filed: Apr. 14, 1988

Related U.S. Application Data

[63] Continuation-in-part of Ser. No. 22,971, Mar. 6, 1987, abandoned.

[30] Foreign Application Priority Data

Mar. 18, 1986 [JP] Japan .................................. 61-59995

[51] Int. Cl.$^4$ ............................................. G02F 1/133
[52] U.S. Cl. .................................... 350/336; 350/333; 340/784
[58] Field of Search ............... 350/332, 333, 334, 335, 350/336; 340/759, 784, 802, 805, 765, 752; 358/241

[56] References Cited

U.S. PATENT DOCUMENTS

| 4,233,602 | 11/1980 | Hanmura | 340/752 |
| 4,481,511 | 11/1984 | Hanmura et al. | 340/752 |
| 4,600,274 | 7/1986 | Morozumi | 350/339 F |
| 4,602,292 | 7/1986 | Togashi et al. | 340/784 |
| 4,617,563 | 10/1986 | Fujiwara et al. | 340/784 |
| 4,679,043 | 7/1987 | Morokawa | 340/805 |

Primary Examiner—Stanley D. Miller
Assistant Examiner—Tai V. Duong
Attorney, Agent, or Firm—Koda and Androlia

[57] ABSTRACT

A liquid crystal display device in which each of the scanning electrodes has a center portion, an upper projection extending upwards from the center portion and a lower projection extending downwards from the center portion, and two picture elements are formed vertically each in an area comprising the upper projection and the center portion and an area comprising the lower projection and the center portion, and the phases in which the data to be given to the signal electrodes are sampled from even scanning picture signals are made different from the phases in which the data to be given to the signal electrodes are sampled from odd scanning picture signals, so that when the scanning electrodes are selected, the data for four scans of picture signals are given to the signal electrodes.

1 Claim, 13 Drawing Sheets

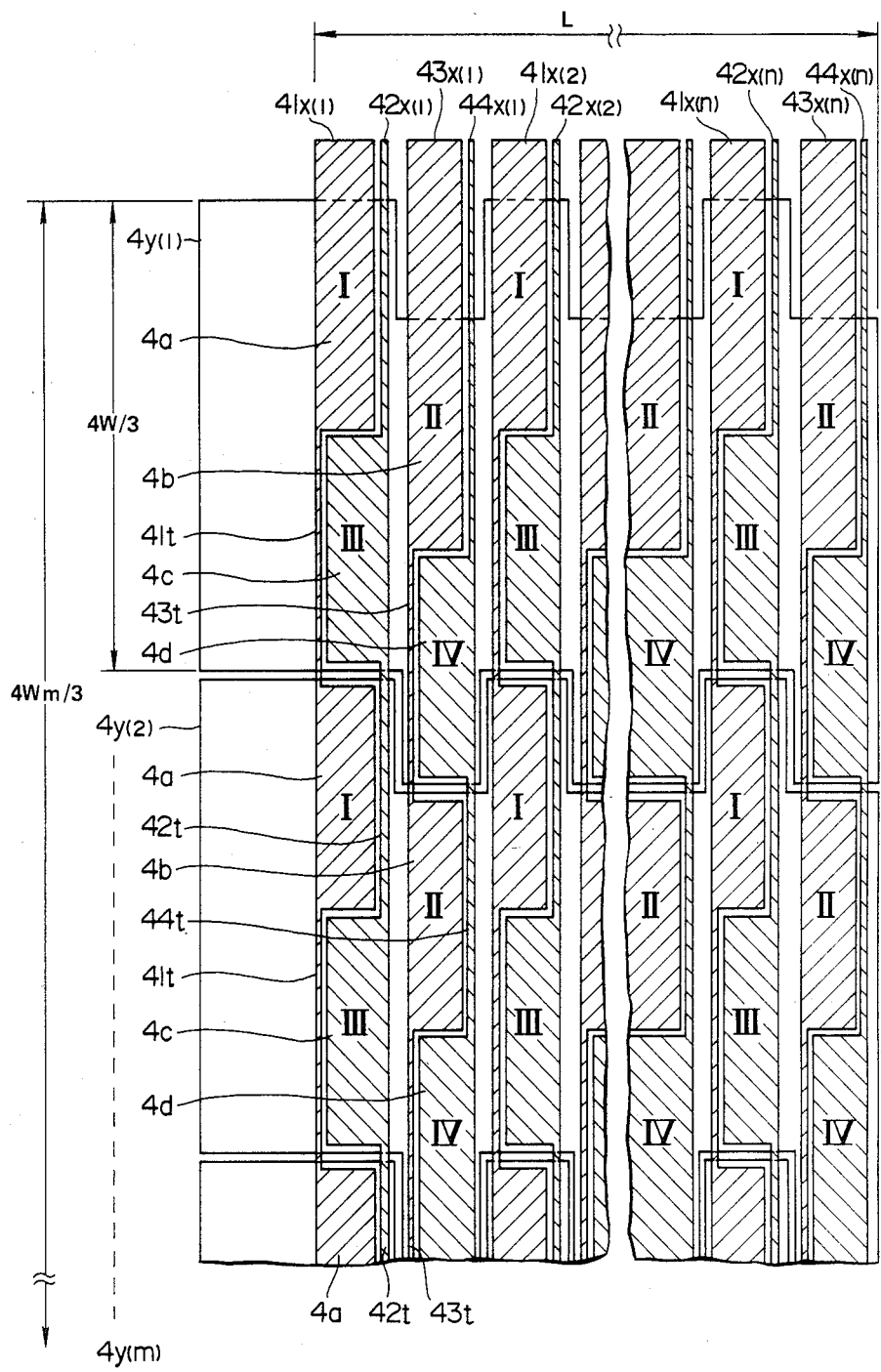

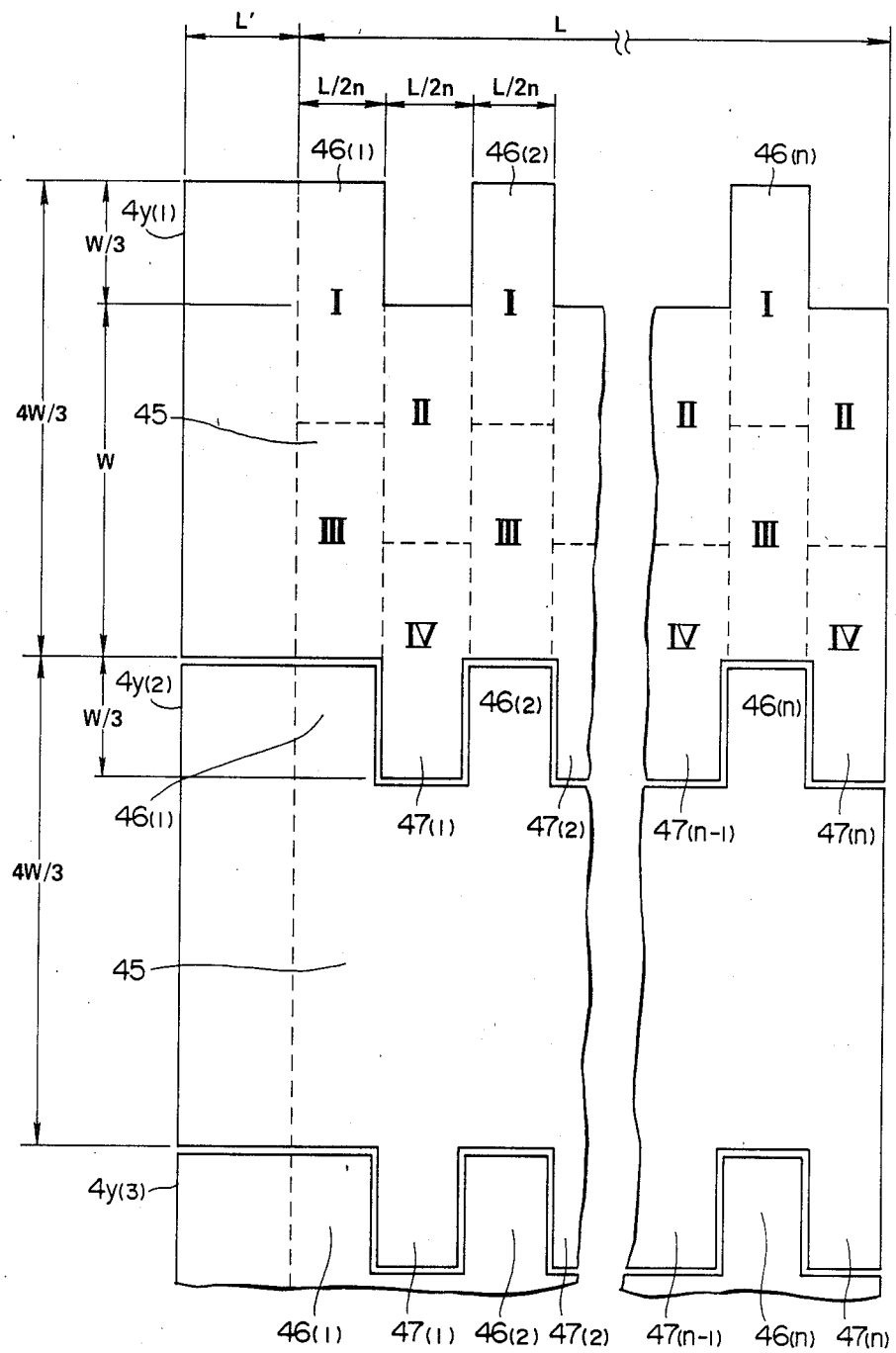

FIG. 6
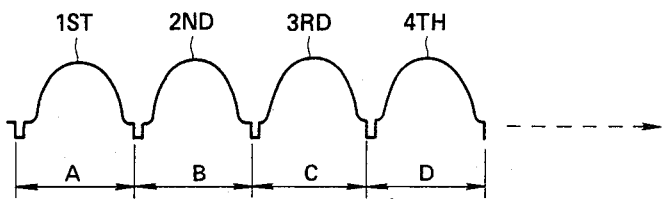
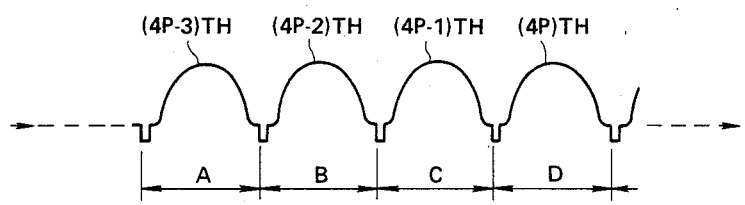
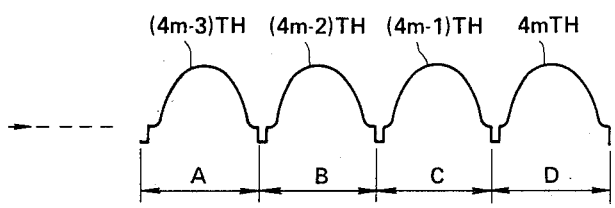
4m PICTURE SIGNALS NECESSARY
FOR ONE FIELD DISPLAY

DATA SAMPLED FROM FIRST
FOUR PICTURE SIGNALS

DATA SAMPLED FROM (4P-3)TH, (4P-2)TH, (4P-1)TH AND 4PTH PICTURE SIGNALS.

DATA SAMPLED FROM LAST FOUR, THAT IS, (4m-3)TH, (4m-2)TH, (4m-1)TH AND 4mTH PICTURE SIGNALS.

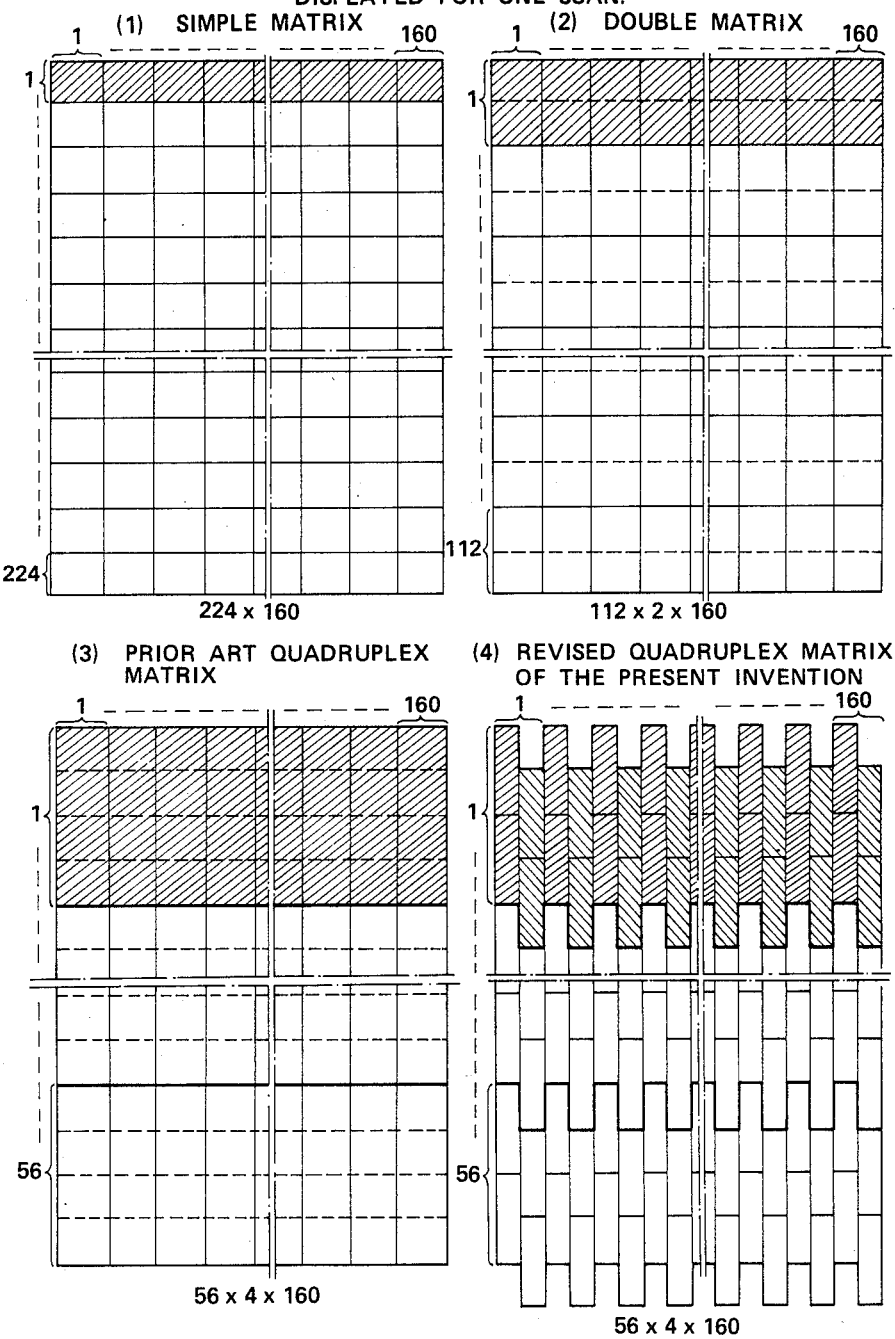

MATRIX DRIVE LIQUID CRYSTAL DISPLAY DEVICE WITH HIGH HORIZONTAL RESOLUTION AND LOW DUTY RATIO

This is a continuation-in-part of application Ser. No. 22,971, filed Mar. 6, 1987, now abandoned.

BACKGROUND OF THE INVENTION

1. Field of the Invention

This invention relates to a multimatrix drive liquid crystal display device which is driven by a time-division driving method and provides high-quality pictures.

2. Description of the Related Art

In general, the liquid crystal display device is constructed by injecting a liquid crystal between an upper substrate having a signal electrode and a lower substrate having a scanning electrode.

FIG. 1 is a partially enlarged view of a conventional simple matrix type liquid crystal display device. In this figure, x and y denote signal electrodes and scanning electrodes, respectively. FIG. 2 is a partially enlarged view of a conventional double matrix type liquid crystal display device. In FIG. 2, $21x$ and $22x$ denote signal electrodes and $2y$ denotes scanning electrodes. Overlapping parts of signal electrodes $21x$ and $22x$ with the scanning electrodes $2y$ form picture elements $2a$ and $2b$ arranged in a vertical direction. As compared with the liquid crystal display device shown in FIG. 1, the liquid crystal display device shown in FIG. 2 has a double duty ratio when the number of vertical picture elements is the same.

In order to increase a duty ratio twice as high as that of the double matrix type, as shown in FIG. 3, a quadruplex matrix type liquid crystal display device has been proposed. $31x$, $32x$, $33x$ and $34x$ are signal electrodes respectively, $3y$ is scanning electrodes, and $3a$, $3b$, $3c$ and $3d$ are picture elements in FIG. 3, connections $31t$, $32t$, $33t$ and $34t$ (vertical leads) between the picture elements which form signal electrodes, triple compared with those of the double matrix type of FIG. 2. As a result, when patterning the signal electrodes, breaking of wire and leaks are apt to take place to decrease the yield considerably. Furthermore, the non-picture area increases, so that the ratio of the total area of picture elements to the entire liquid crystal display surface remarkably decreases. This ratio is hereinafter called an "aperture ratio". As a result, the picture images roughen and the picture quality markedly deteriorates.

SUMMARY OF THE INVENTION

The object of the invention is to provide a liquid crystal display device which is free of the defects of the aforementioned conventionally used quadruplex matrix type and which has a high degree of picture quality with a double horizontal resolution. That is to say, according to the present invention, there is provided a quadruplex matrix type liquid crystal display device in which sampling holds are taken with a frequency of n times with respect to each of 4m picture signals necessary for a one-field picture display; whenever 4n sampling holds are taken with respect to 4 picture signals, selective pulses are successively sent by time division from m horizontal scanning electrodes; every 4n sampling data for 4 picture signals with respect to the selective pulse from one of the horizontal scanning electrodes are given by 4n signal electrodes, respectively; and thus pictures are formed, wherein (a) assuming that an order of the data sampled by the (k)th (where $k=1, 2 \ldots n$) sampling of each of 4 continuous picture signals is $(4p-4)n+k$, $(4p-3)n+k$, $(4p-2)n+k$ and $(4p-1)n+k$ (where $k=1, 2 \ldots n$, and $p=1, 2 \ldots m$), $((4p-4n+k))$th and $((4p-2)n+k)$th samplings are in phase, and $((4p-3)n+k)$th and $((4p-1)n+k)$th samplings are in phase and are 180° out of phase with the $((4p-4)n+k)$th and $((4p-2)n+k)$th samplings; (b) each of portions for forming directly picture elements of the m horizontal scanning electrodes includes a center portion in the shape of a rectangle having: a width of W and a length of L; assuming that the length of L is divided by 2n to make 2n divisions of the center portion, each of the portions for forming directly picture elements further includes n upper projections each having a length of L/2n and a width of W/3 and extending upwards from the respective center portion divisions in odd numbers counted in a direction of the L from one end of each horizontal scanning electrode; and n lower projections each having a length of L/2n and a width of W/3 and extending downwards from the respective center portion divisions in even numbers; (c) each of the portions for forming directly picture elements of the 4n signal electrodes is shaped so that along a width of 4Wm/3, electrodes for producing m picture elements each having a length of L/2n and a width of 2W/3 are coupled by means of leads; and (d) assuming that a region made by adding the width (W/3) of the upper projection of each of the scanning electrodes to the width (W) of the center portion which exists on a lower part of the upper projection is vertically divided into two equal parts, the upper part and the lower part of the two equally divided parts of each scanning electrode are called a first position and a third position respectively of the scanning electrode, and also assuming that a region made by adding the width (W/3) of the lower projection of each of the scanning electrodes to the width (W) of the center portion which exists on an upper part of the lower projection is vertically divided into two equal parts, the upper part and the lower part of the two equally divided parts are called a second position and a fourth position respectively of the scanning electrode, and furthermore, assuming that the positions of each of the signal electrodes opposite to the positions of each of the scanning electodes are called a first position, a third position, a second position and a fourth position of the signal electrode, the $((4p-4)n+k)$th sampling data are given into the first position of the signal electrode, the $((4p-3)n+k)$th sampling data are given into the second position of the signal electrode, the $((4p-2)n+k)$th sampling data are given into the third position of the signal electrode and the $((4p-1)n+k)$th sampling data are given into the fourth position of the signal electrode.

BRIEF DESCRIPTION OF THE DRAWINGS

FIG. 4A is a partially enlarged view of a display portion of a first embodiment of a liquid crystal display device according to the present invention;

FIG. 4B is a partially enlarged view of the scanning electrodes of the liquid crystal display device according to the present invention;

FIG. 6 is a wave form chart showing the first four picture signals, intermediate four picture signals and last four picture signals among 4m picture signals required to display a one-field picture;

FIGS. 7A to 7C are wave form charts each showing the order and phases of sampling holds with respect to each of picture signals shown in FIG. 6, in which FIG. 7A is a chart showing the order and phases of sampling holds with respect to the first four picture signals among 4m picture signals; FIG. 7B is a chart showing the order and phases of sampling holds with respect to the (4p−3)th, (4p−2)th, (4p−1)th and (4p)th picture signals among th 4m picture signals; and FIG. 7C is a chart showing the order and phases of sampling holds of the last four picture signals, that is, the (4m−3)th, (4m−2)th, (4m−1)th and (4m)th picture signals among the 4m picture signals;

FIG. 11 is a reference schematic representation for the comparison of the arrangements of the conventional matrix driving sytems shown in FIGS. 1, 2 and 3 and the arrangement of the improved quadruplex matrix driving system of the present invention shown in FIGS. 4 and 5.

DETAILED DESCRIPTION OF THE PREFERRED EMBODIMENTS

Figure 1:
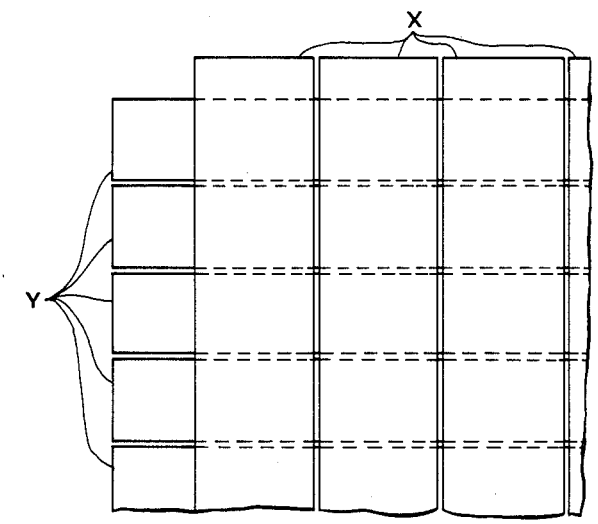
FIG. 1 is a partially enlarged view of a display portion of a conventional simple matrix type liquid crystal display device.

Embodiments of the invention will now be described with reference to the drawings, in which FIGS. 4A and 4B show a structure of a first embodiment of a liquid crystal display device according to the invention, in which FIG. 4B shows only scanning electrodes. In FIG. 4B, $4y$ denotes scanning electrodes each of which is formed in a horizontal direction and has upper projections 46 and lower projections 47 with respect to a center portion 45.

Each of scanning electrodes $4y$ includes an incidental portion in the shape of a rectangle having a width of 4/3W and a length of L′ (however, any shape will do, because this incidental portion has no direct relation to the formation of the picture elements); and the center portion 45 having a length of L and a width of W. Furthermore, assuming that the length of L of the center portion 45 is divided by 2n to make 2n divisions, each scanning electrode $4y$ includes n upper projections 46 (1), 46 (2) . . . 46 (n) each having a length of L/2n and a width of W/3 and extending upwards from the respective center portion divisions in odd numbers counted in a direction of L from the left end of each scanning electrode; and n lower projections 47 (1), 47 (2) . . . 47 (n) each having a length of L/2n and a width of W/3 and extending downwards from the respective center portion divisions in even numbers. These center portions and upper and lower projections have direct relations to the formation of picture elements. In the above, n is the number of sampling holds with respect to one picture signal.

In FIG. 4A, $41x$ (1), $42x$ (1), $43x$ (1), $44x$ (1), $41x$ (2), $42x$ (2 . . . $41x$ (n), $42x$ (n), $43x$ (n) and $44x$ (n) are signal electrodes which are shown in slant lines. In the area comprising the upper projections 46 (1), 46 (2). . . 46 (n) and the center portion 45 of each of scanning electrodes $4y$ (1), $4y$ (2) . . . and $4y$ (m), the signal electrodes $41x$ (1), $41x$ (2) . . . $41x$ (n) and $42x$ (1), $42x$ (2) . . . $42x$ (n) have intersections with the scanning electrodss $4y$ (1), $4y$ (2) . . . $4y$ (m) and form picture elements $4a$ . . . $4a$ and $4c$ . . . $4c$, respectively. Each picture element $4a$ is placed above each picture element $4c$. In the area comprising the lower projections 47 (1), 47 (2) . . . 47 (n) and the center portion 45 of each of scanning electrodes $4y$ (1), $4y$ (2) . . . $4y$ (m), the signal electrodes $43x$ (1), $43x$ (2) . . . $43x$ (n) and $44x$ (1), $44x$ (2) . . . $44x$ (n) have intersections with the scanning electrodes $4y$ (1), $4y$ (2) . . . $4y$ (m) and form picture elements $4b$ . . . $4b$ and $4d$ . . . $4d$, respectively. Each picture element $4b$ is placed above each picture element $4d$. That is to say, the portions of each of signal electrodes $41x$ (1), $42x$ (1), $43x$ (1), $44x$ (1), $41x$ (2), $42x$ (2), $43x$ (2), $44x$ (2) . . . $41x$ (n), $42x$ (n), $43x$ (n) and $44x$ (n) for directly forming picture elements are connected by leads $41t$ in such a manner that within the range of a width of 4W/3×m (where m is the number of all scanning electrodes) in a vertical direction, m picture elements each having a length of L/2n and a width of 2W/3 are formed. For example, for the signal electrode $41x$ (1), m picture elements $4a$ are formed.

Assuming that a region made by adding the width (W/3) of the upper projection of each of the scanning electrodes to the width (W) of the center portion which exists on a lower part of the upper projection is vertically divided into two equal parts, the upper part and the lower part of the two equally divided parts of each scanning electrode are called a first position (I) and a third position (III) respectively of the scanning electrode. Also, assuming that a region made by adding the width (W/3) of the lower projection of each of the scanning electrodes to the width (W) of the center portion which exists on an upper part of the lower projection is vertically divided into two equal parts, the upper part and the lower part of the two equally divided parts are called a second position (II) and a fourth position (IV) respectively of the scanning electrode. Furthermore, assuming that the positions of each of the signal electrodes opposite to the positions of each of the aforementioned scanning electrodes are called a first position (I), a third position (III), a second position (II) and a fourth position (IV) of the signal electrode, picture elements $4a$, $4b$, $4c$ and $4d$ are formed in the first position (I), second position (II), third position (III) and fourth position (IV) of the scanning electrode and signal electrode, respectively.

As will be seen from FIGS. 4A and 4B, in each of the scanning electrodes $4y$ (1), $4y$ (2) . . . $4y$ (m), the y-coordinate of the center of gravity of the picture element $4b$ (second position) is positioned at a middle point between the y-coordinate of the center of gravity of the picture element $4a$ (first position) and the y-coordinate of the center of gravity of the picture element $4c$ (third position), and the y-coordinate of the center of gravity of the picture element $4c$ is positioned at a middle point between the y-coordinate of the center of gravity of the picture element $4b$ (second position) and the y-coordinate of the center of gravity of the picture element 4d (fourth position).

Next, a method of displaying pictures onto the liquid crystal display device according to the present invention shown in FIG. 4A will be explained. FIG. 6 shows 4m signals necessary for a one-field picture to be displayed on the liquid crystal display device, in which the horizontal direction represents time and the vertical direction represents the amplitude of the signal. In FIG. 6, A, B, C and D each shows one horizontal scanning interval (the four make a set). In this figure, (1), (2), (3) and (4) denote the first, second, third and fourth picture signals; 4p−3 to 4p denote the (4p−3)th to the (4p)th picture signals; and 4m−3 to 4m denote the (4m−3)th to the (4m)th picture signals, i.e. the last four picture signals, respectively.

Figure 7A:
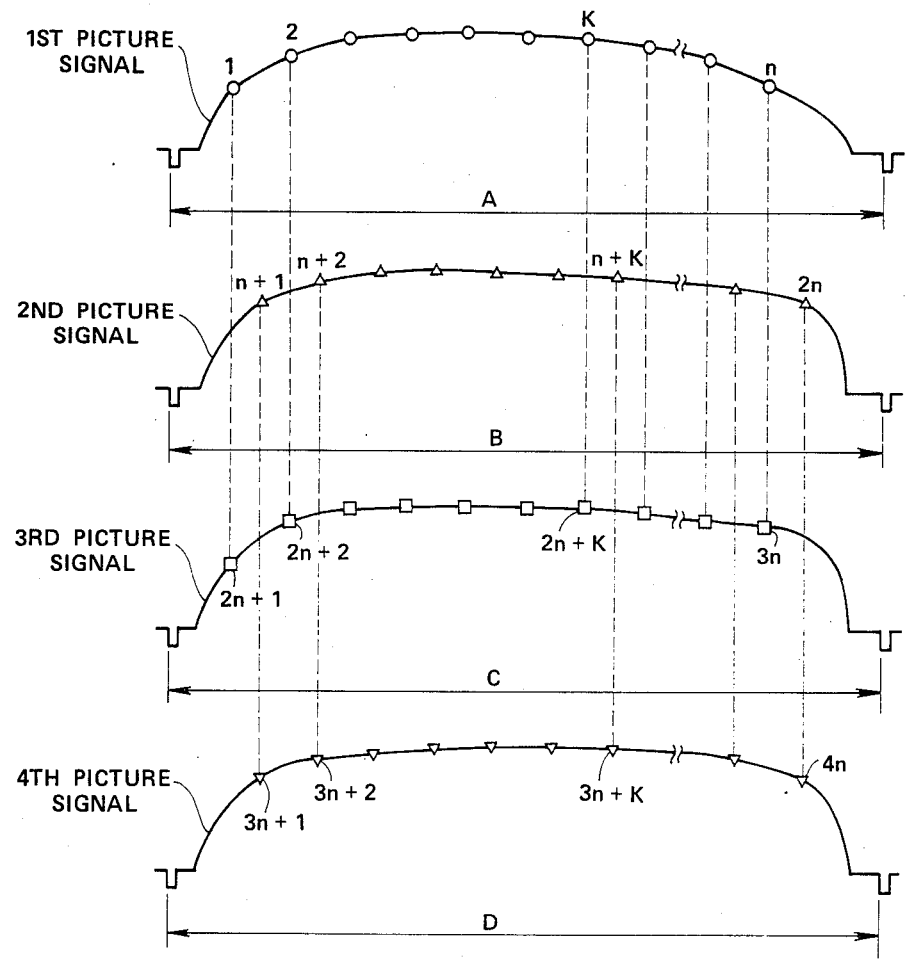
Figure 7B:
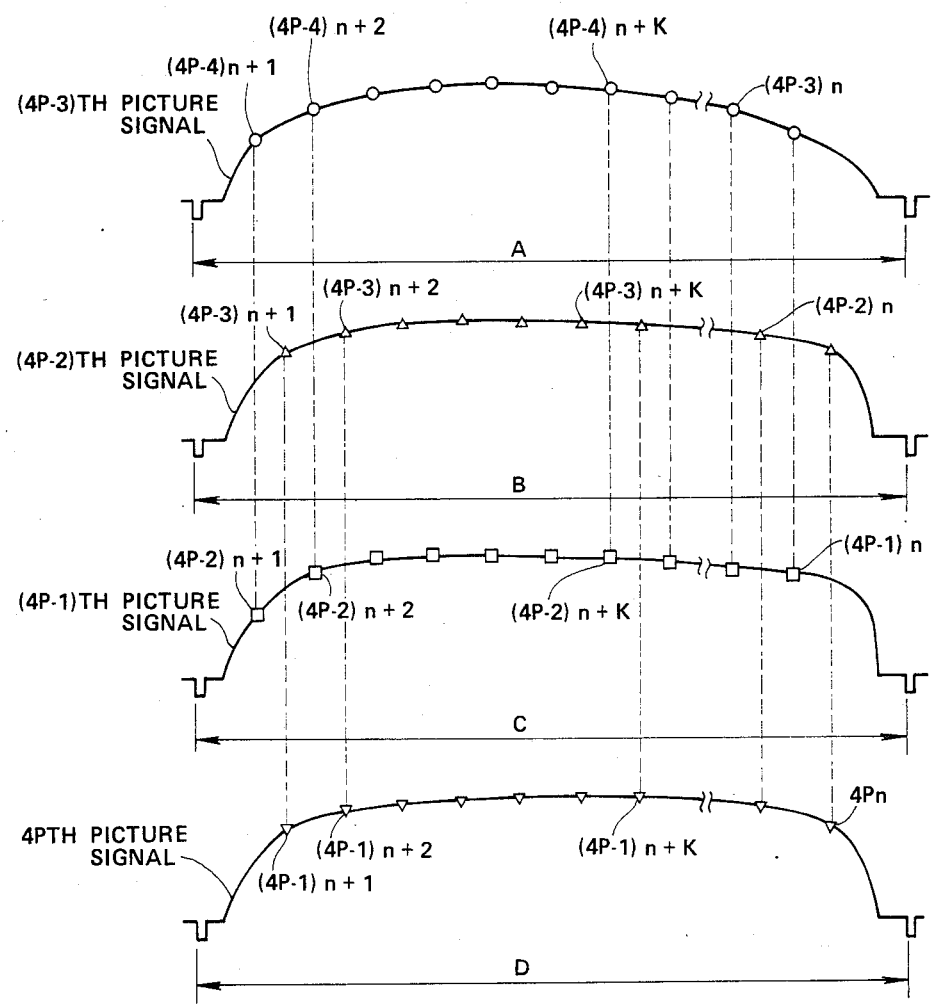
Figure 7C:
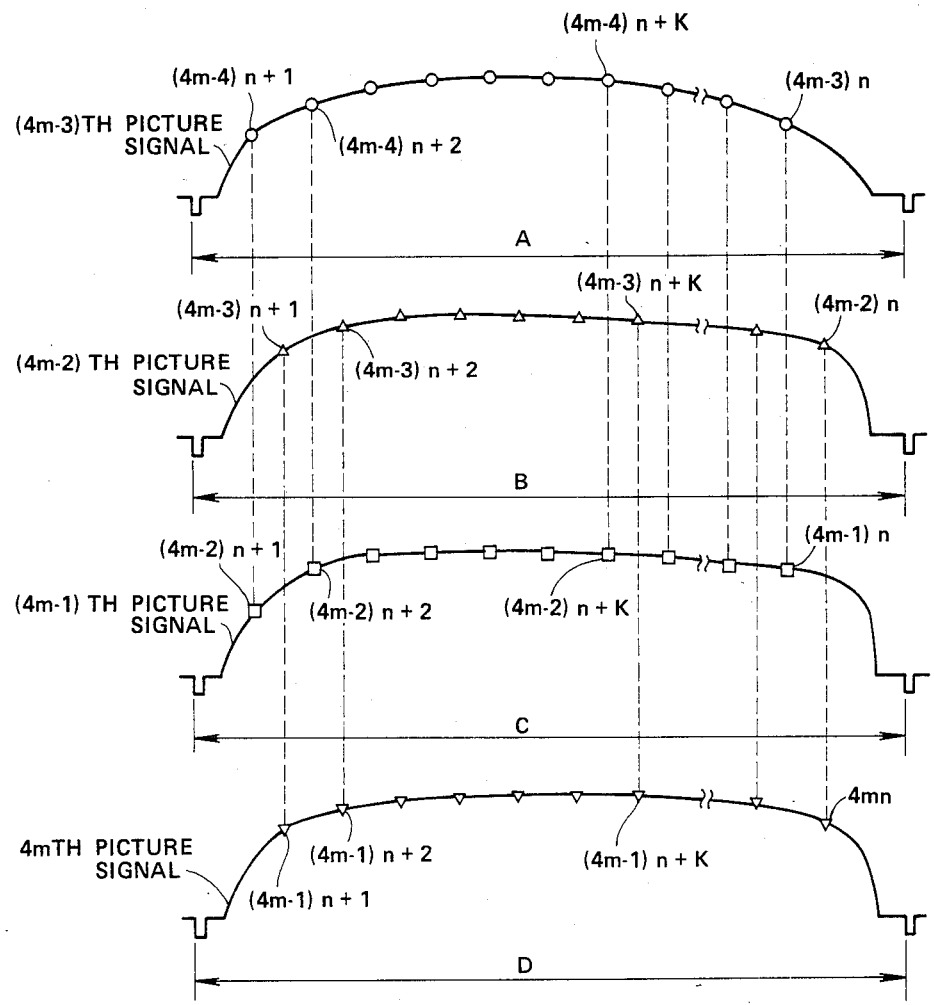

FIG. 7A to 7C are wave form charts showing the order and phases of sampling holds with respect to each of the picture signals of FIG. 6. FIG. 7A shows the order and phases of sampling holds with respect to the first four picture signals among the 4m picture signals; FIG. 7B shows the order and the phases of sampling holds with eespect to the (4p−3)th, the (4p−2)th, the (4p−1)th and the (4p)th picture signals among the 4m picture signals; and FIG. 7C shows the order and phases of sampling holds with respect to the last four picture signals, i.e. the (4m−3)th, the (4m−2)th, the (4m−1)th and the (4m)th picture signals among the 4m picture signals.

In the first scan A shown in FIG. 7A, the picture signal (1) is sampled at the time marked with circles n times so as to correspond to the positions of the picture elements 4a of FIG. 4A, and the n data are temporarily stored in memory. In the second scan B, the picture signal (2) is sampled at the time marked with triangles n times so as to correspond to the positions of the picture elements 4b of FIG. 4A, out of phase by an angle of $\pi$ with the first scan A, and the n data are temporarily stored in memory. In the third scan C, the picture signal (3) is sampled at the time marked with squares n times so as to correspond to the positions of the picture elements 4c of FIG. 4A in phase with the first scan A, and the n data are temporarily stored in memory. In the fourth scan D, the picture signal (4) is sampled at the time marked with inverted triangles n times so as to correspond to the positions of the picture elements 4d of FIG. 4A, in phase with the second scan B, and the n data are temporarily stored in memory. When one of scanning electrodes 4y (1), 4y (2) ... 4y (m) is selected, these 4n sampled data for the four scans are given to the signal electrodes at a time. That is to say, for example, at the time of selection of the scanning electrode 4y (1), the 4n data sampled from the picture signals (1), (2), (3) and (4) at the first scan A, the second scan B, the third scan C and the fourth scan D are sent to the respective signal electrodes 41x (1), 41x (2) ... 41x (n); 43x (1), 43x (2) ... 43x (n); 42x (1), 42x . (2) ... 42x (n); and 44x (1), 44x (2) ... 44x (n). Thus, pictures are displayed on picture elements 4a, 4b, 4c and 4d respectively of first position (I), second position (II), third position (III) and fourth position (IV). Since the y-coordinates of gravity of the first position (I), second position (II), third position (III) and fourth position (IV) of these picture elements are spaced by W/3 in the vertical direction, the four-layered real images on the center of gravity can clearly be displayed.

This operation will be discussed in detail.

Figure 8:
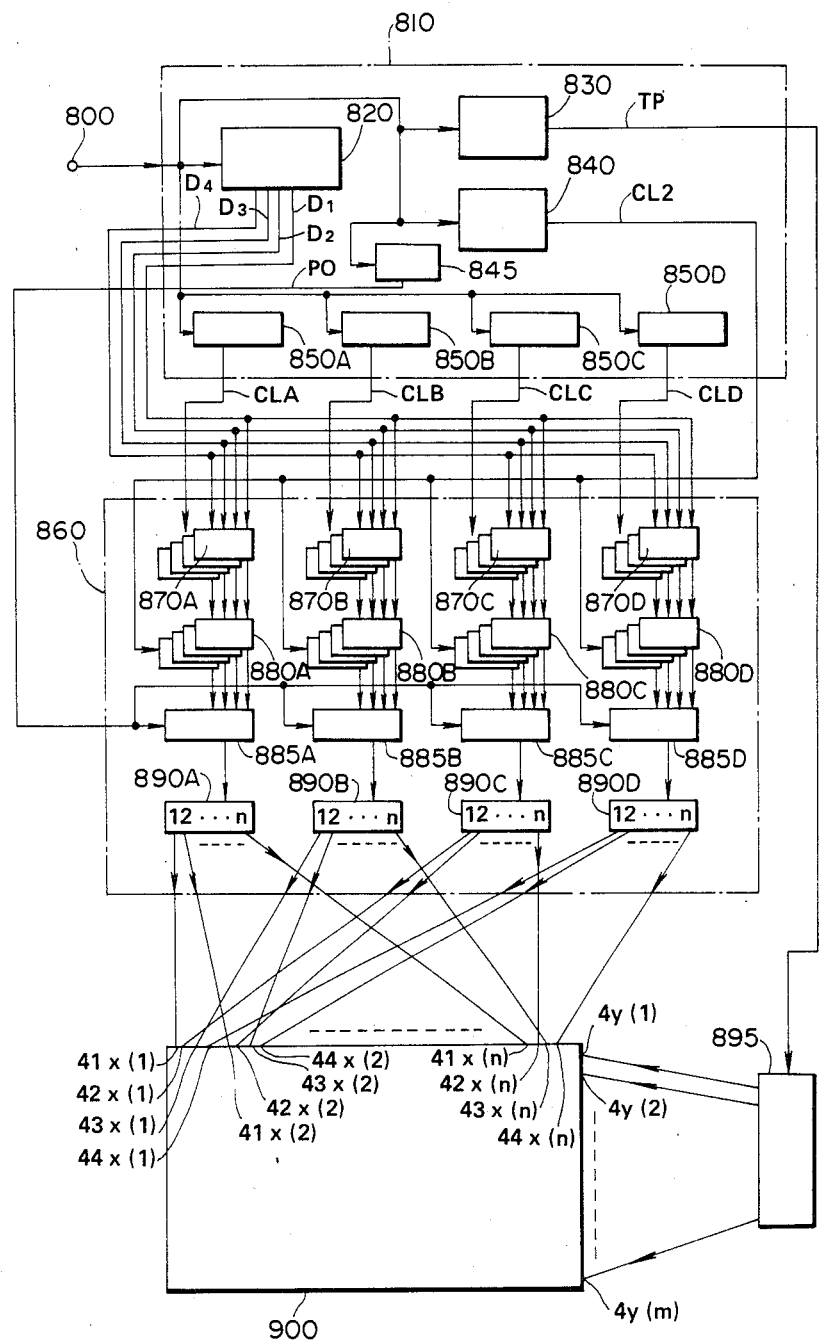
FIG. 8 is a circut diagram of a driving circuit for disllaying the pictures on electrodes of the liquid crystal display device according to the present invention.

FIG. 8 is a circuit diagram of a drive circuit for displaying pictures on the above liquid crystal display device. In this figure, 900 denotes the liquid crystal display device shown in FIG. 4, and 810 denotes a control integrated circuit (IC). The control IC 810 controls a signal drive IC 860 and a scanning drive IC 895, and the outputs of the signal drive IC 860 and the outputs of the scanning drive IC 895 provide pictures on the liquid crystal display device. The control IC 810 comprises an A-D converter 820 for converting an analog picture signal into a 4-bit digital signal; a timing control signal generating circuit 830 for generating a timing control signal TP to make the scanning drive IC 895 start sanning; a latch clock generating circuit 840 for sending a latch clock signal CL2 to the signal drive IC 860; a pulse width modulating signal generating circuit 845 for generating four types of pulse width modulating signals PO; and sampling pulse generating circuits 850A, 850B, 850C and 850D for generating sampling pulse trains CLA, CLB, CLC and CLD.

There is the $\pi$ phase difference (detailed in FIGS. 7A to 7C) between the sampling pulse tranns CLA and CLC generated by odd sampling pulse generating circuits 850A and 850C and the sampling pulse trains CLB and CLD generated by even sampling pulse generating circuits 850B and 850D. The signal drive IC 860 comprises shift registers 870A, 870B, 870C and 870D; latch circuits 880A, 880B, 880C and 880D; pulse-width modulators 885A, 885B, 885C and 885D for producing signals representing sixteen types of tones by combining 4-bit outputs of the latch circuits with four types of pulse-width modulating signals PO sent from the pulse-width modulating signal generating circuit 845; and drivers 890A, 890B, 890C and 890D for generating drive pulses to drive the signal electrodes.

Next, the signal flow will be explained.

A picture signal 800 is converted from analog to digital by the A-D converter 820 into 4-bit data $D_1$, $D_2$, $D_3$ and $D_4$, and the converted data are sent into shift registers 870A, 870B, 870C and 870D, respectively by sampling clock pulse trains CLA, CLB, CLC and CLD produced in the sampling clock generating circuits 850A, 850B, 850C and 850D. The contents of the shift registers 870A, 870B, 870C and 870D are stored in the latch circuits 880A, 880B, 880C and 880D, respectively by the output CL2 of the latch clock generating circuit 840. In the pulse-width modulators 885A, 885B, 885C and 885D, the 4-bit outputs of the latch circuits 880A, 880B, 880C and 880D are combined with the four types of pulse-width modulating signals PO produced in the pulse-width modulating signal generating circuit 845, thereby producing signals representing the sixteen tones. Then, drive pulses are produced by drivers 890A, 890B, 890C and 890D and sent into the respective signal electrodes 41x (1), 41x (2) 41x (n); 43x (1), 43x (2) ... 43x (n); 42 (1), 42x (2) ... 42x (n); and 44x (1), 44x (2) ... 44x (n) described with reference to FIG. 4. The scanning drive IC 895 sends selective signals to the scanning electrodes 4y (1), 4y (2) ... 4y (m) described with reference to FIG. 4 on the basis of the signal TP of the timing control signal generating circuit 830.

Figure 9:
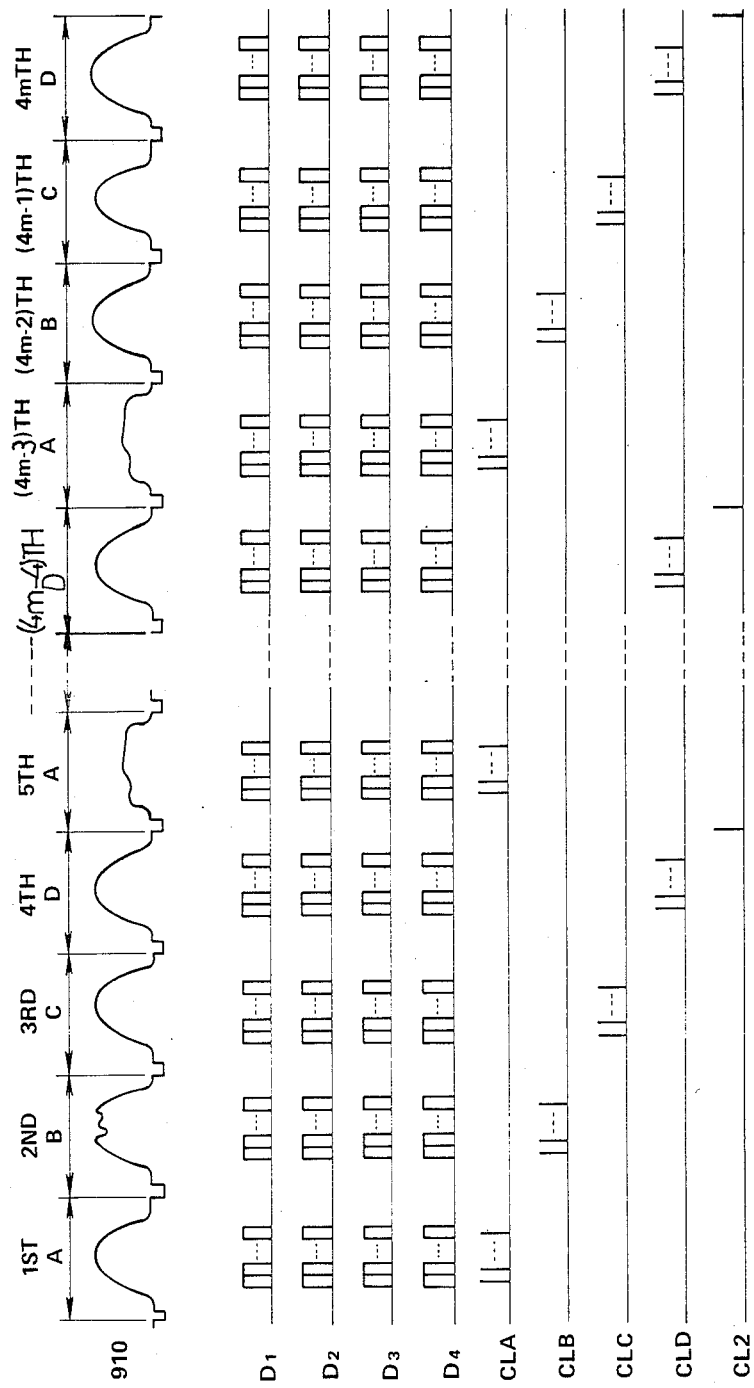
FIG. 9 is a wave form chart showing the signals of the essential parts of the driving circuit of FIG. 8.

FIG. 9 shows signals at main parts of the drive circuit. 910 is picture signals, and $D_1$, $D_2$, $D_3$ and $D_4$ are picture signals converted from analog to digital. Sampling clock pulses CLA, CLB, CLC and CLD are the respective pulse trains generated in horizontal scanning at the first interval A, the second interval B, the third interval C and the fourth interval D. The converted data groups $D_1$, $D_2$, $D_3$ and $D_4$ are successively sent into the shift registers 870A, 870B, 870C and 870D (FIG. 8), and after the scannings at A, B, C and D are finished, the data for four scans are latched at a time by the output CL2 of the latch clock generating circuit 840.

Figure 5:
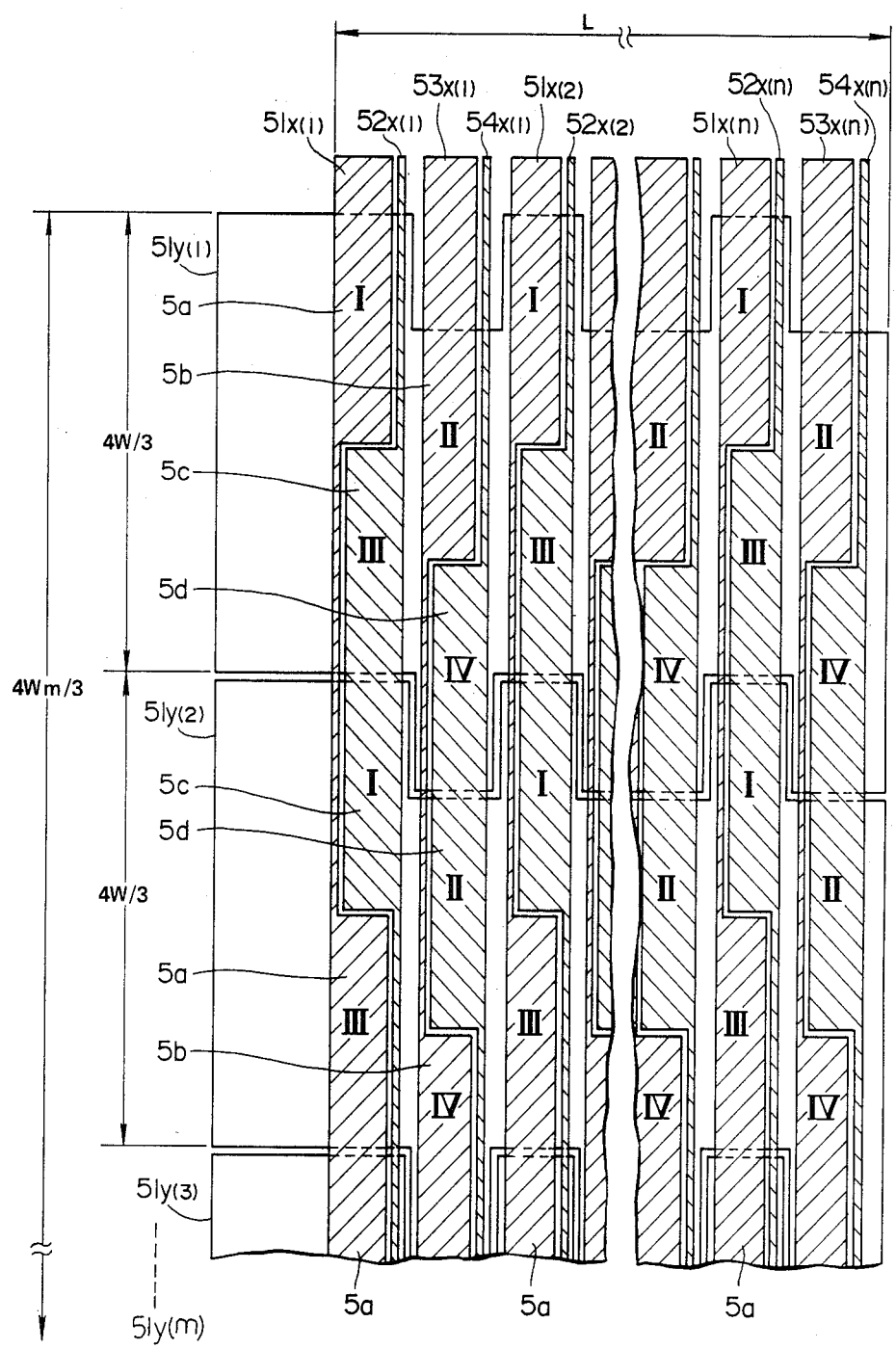
FIG. 5 is a partially enlarged view of a display portion of a second embodiment of a liquid crystal display device according to the present invention.

Referring to FIG. 5, there is shown a partially enlarged view illustrating a structure of a second embodiment of a liquid crystal display device according to the invention. Scanning electrodes 51y (1), 52y (2), 51y (3) ... shown in heavy solid lines are similar in shape to the scanning electrodes 4y (1), 4y (2), 4y (3) ... of FIG. 4B. 51x (1), 52x (1), 53x (1), 54x (1), 51x (2), 52x (2) ... 51x (n), 52x (n), 53x (n) and 54x (n) denote signal electrodes which are represented in slant lines. Overlapping parts of the scanning electrodes and signal electrodes form picture elements 5a, 5b, 5c and 5d as in FIG. 4A. In the odd scanning electrodes 51y (1), 51y (3) ..., like those in FIG. 4A, the respective picture elements are formed. Unlike the scanning electrodes 51y (1), 51y (3) ..., the scanning electrodes 51y (2), 51y (4) ... (not shown) in even numbers are arranged so that each picuure element 5a is positioned below each picture element 5c and that each picture element 5b is positioned below each picture element 5d.

When pictures are displayed on the liquid crystal display device of the second embodiment shown in FIG. 5 according to the present invention, the odd scanning electrodes 51y (1), 51y (3) ... perform the same operation as in FIG. 4A. The data sampled from the picture signals at the first scan A, the second scan B, the third scan C and the fourth scan D in FIGS. 7A to 7C are sent to signal electrodes 51x (1), 53x (1), 52x (1), 54x (1) ... 51x (h), 53x (n), 52x (n) and 54x (n), respectively and then displays are provided on picture elements 5a (I), 5b (II), 5c (III) and 5d (IV). On the other hand, in the even scanning electrodes 51y (2), 51y (4) ... (not shown), the data sampled from picture signals at the first scan A, the second scan B, the third scan C and the fourth scan D in FIGS. 7A to 7C are sent to signal electrodes 52x (1), 54x (1), 51x (1), 53x (1) ... 52x (n), 54x (n), 51x (n) and 53x (n), and then displays are provided on picture elements 5c (I), 5d (II), 5a (III) and 5b (IV).

Figure 10:
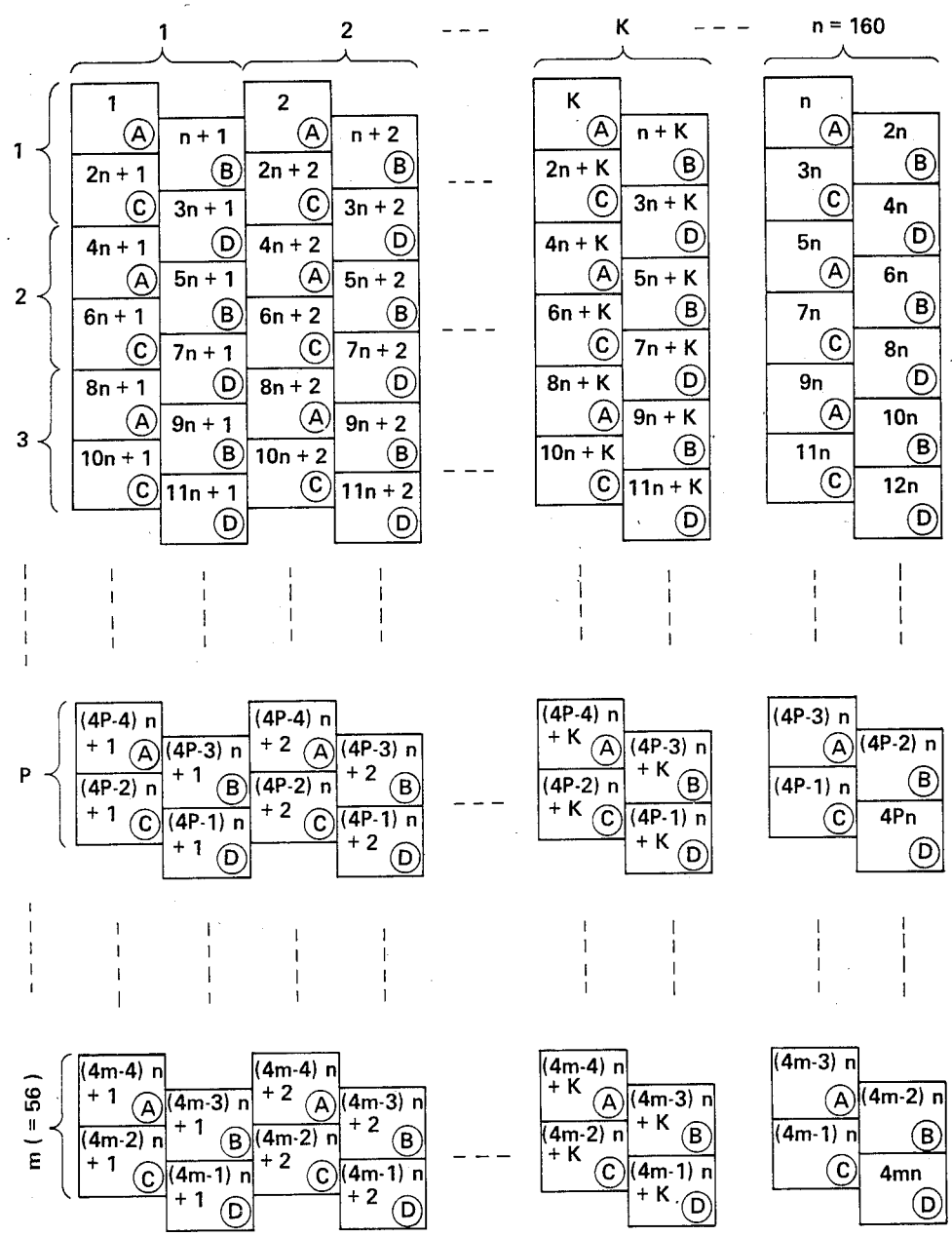
FIG. 10 is a block diagram showing the arrangements of 4mn picture elements forming the pictures of the liquid crystal display devices of FIGS. 4A and 5 of the present invention and the numbers of sampling data supplied to the 4mn picture elements.

FIG. 10 shows the arrangement of 4mn picture elements forming picture images of the liquid crystal display device (FIGS. 4A and 5) according to the present invention and the numbers of sampling data supplied thereto.

As will be apparent from FIG. 10, the first n data (1, 2, k ... n) sampled from the first picture signal, the second n data (n+1, n+2 ... k ... 2n) sampled from the second picture signal, the third n data (2n+1, 2n+2 .. . 2n+k ... 3n) from the third picture signal and the fourth n data (3n+1, 3n+2 ... 3n+k ... 4n) sampled from the fourth picture signal are fed respectively to the first positions (I), second positions (II), third positions (III) and fourth positions (IV) belonging to the first scanning electrode. Similarly the fifth n data (4n+1, 4n+2 ... 4n+k ... 5n) sampled from the fifth picture signal, the sixth n data (5n+1, 5n+2 ... 5n+k 6n) sampled from the sixth picture signal, the seventh n data (6n+1, 6n+2 ... 6n+k ... 7n) sampled from the seventh picture signal and the eighth n data (7n+1, 7n+2 ... 7n+k ... 8n) are fed respectively to the first positions (I), second positions (II), third positions (III) and fourth positions (IV) belonging to the second scanning electrode.

Generally, the (4p−3)th n data ((4p−4)n+1, (4p−4)n+2 ... (4p−4)n+k ... (4p−3)n) sampled from the (4p−3)th picture signal, the (4p−2)th n data ((4p−3)n+1, (4p−3)n+2 ... (4p−3)n+k ... (4p−2)n) sampled from the (4p−2)th picture signal, the (4p−1)th n data ((4p−2)n+1, (4p−2)n+2 ... (4p−2)n+k ... (4p−1)n) sampled from the (4p−1)th picture signal and the (4p)th n data ((4p−1)n+1, (4p−1)n+2 ... (4p−1)n+k ... 4pn) sampled from the (4p)th picture signal are fed respectively to the first positions (I), second positions (II), third positions (III) and fourth positions (IV) belonging to the (p)th scanning electrode. And in the end, the (4m−3)th n data ((4m−4)n+1, (4m−4)n+3 ... (4m−4)n+k ... (4m−3)n) sampled from the (4m−3)th picture signal, the (4m−2)th n data ((4m−3)n+1, (4m−3)n+2 ... (4m−3)n+k ... (4n−2)n) sampled from the (4m−2)th picture signal, the (4m−1)th n data ((4m−2)n+1, (4m−2)n+2 ... (4m−2)n+k ... (4m−1)n) sampled from the (4m−1)th picture signal, and (4m)th n data ((4m−1)n+1, (4m−1)n+2 ... (4m−1)n+k ... 4mn) sampled from (4m)th picture signal are fed respectively to the first positions (I), second positions (II), third positions (III) and fourth positions (IV) belonging to the (m)th scanning electrode (last scanning electrode). In the above example, n=160 and m=56; therefore, the total picture elements are 35840 (160×4×56); and p represents any numbered scanning electrode out of the 56 scanning electrodes; and k represents any numbered data out of the 120 sampled data.

FIG. 11 is a reference schematic view showing the arrangement of each of the aforementioned driving systems of the simple matrix, the double matrix, the prior art quadruplex matrix and the revised quadruplex matrix of the present invention, in which each total number of the picture elements is 35840. The sections shown in slant lines show a total of rows of picture elements displayed by scanning of one scanning electrode.

Figure 2:
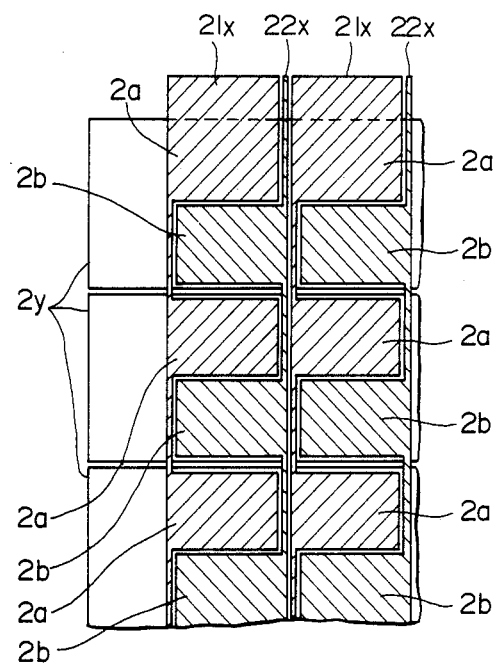
FIG. 2 is a partially enlarged view of a display portion of a conventional double matrix type liquid crystal display device.
Figure 3:
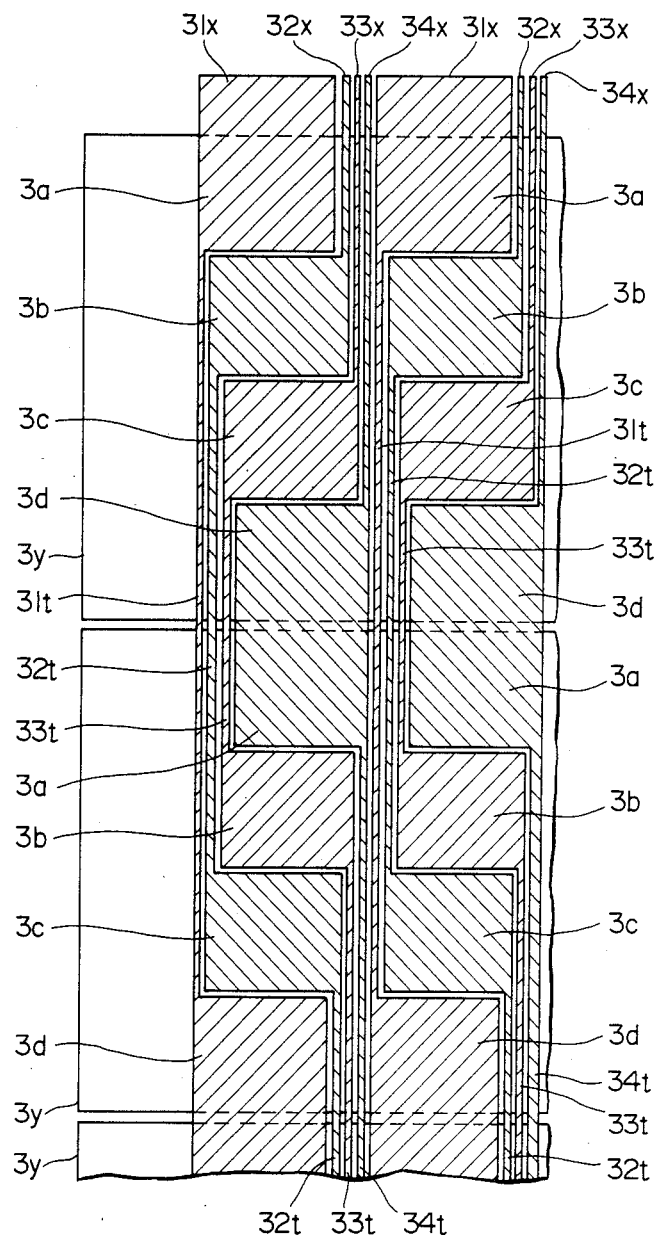
FIG. 3 is a partially enlarged view of a display portion of a conventional quadruplex matrix type liquid crystal display device.

Table 1 shows the comparison of performance of each of driving systems calculated from FIGS. 1, 2 and 3; FIGS. 4A and 5; and FIG. 11.

As will be seen from this table, the revised quadruplex matrix liquid crystal display device of the present invention has the following features over the prior art quadruplex matrix liquid crystal display device:

(1) The horizontal resolution of the present invention is twice as high as the conventional quadruplex matrix. Although a total of 35840 picture elements and a total of 224 lines of vertical resolution are the same, the reason why the present invention shows the value, i.e. 320 lines of horizontal resolution which is the double of the prior art matrix, is that the present invention has the shape and arrangement of picture elements shown in FIGS. 4A, 4B, 5 and FIG. 11 (4). This is a very unique structure of the present invention and is nowhereshown in any prior art. That is to say, this feature has first been realized by the combination of the scanning electrodes and the signal electrodes having the structure as set forth in the appended claims and makes it possible to enhance the performance of picture elements.

(2) The number of leads (connections between picture elements) in the vertical direction of the present invention is less than ⅔ of the conventional quadruplex matrix. When compared with the overall length of picture element connections 31t, 32t, 33t and 34t of the signal electrodes 31x, 32x, 33x and 34x of the conventional quadruplex matrix type liquid crystal display device shown in FIG. 3, the overall length of picture element connections 41t, 42t, 43t and 44t of signal electrodes 41x, 42x, 43x and 44x of the liquid crystal display device of the present invention shown in FIG. 4A is less than ⅔ of the conventional matrix. Therefore, in the liquid crystal display device of the present invention, when etching to make signal electrodes, the breaking of the connections between the picture elements and the leakage between the adjacent electrodes are materially reduced. Therefore, the yield of the liquid crystal display device of the present invention is remarkably increased as compared with that of FIG. 3.

(3) As the number of leads is reduced, the aperture ratio is increased. That is, the aperture ratio of the present invention is between that of the conventional double matrix and that of the conventional quadruplex matrix, thereby enhancing the performance of the device, compared with the conventional quadruplex matrix.

(4) The duty ratio is maintained on the level of the conventional quadruplex matrix (twice as high as the double matrix). In the prior art quadruplex matrix, the duty ratio is twice as high as that of the double matrix, but it has its drawbacks that leads are three times as many as those of the double matrix and thus the aperture ratio is decreased and also manufacturing yield is reduced. In addition, the resolution in the horzontal direction of prior art is low. The present invention has not only solved all the drawbacks of prior art quadruplex matrix without impairing its advantage, i.e. high duty ratio, but also succeeded in doubling the horizontal resolution.

and m are integers; whenever 4n sampling holds are taken with repect to 4 picture signals, selective pulses are successively sent by time division from m horizontal scanning electrodes; every 4n sampling data for 4 picture signals with respect to the selective pulse from one of the horizontal scanning electrodes are given by 4n signal electrodes, respectively; and thus pictures are formed, wherein (a) an order of the data sampled by the (k)th (where k=1, 2 ... n) sampling of each of 4 continuous picture signals is $(4p-4)n+k$, $(4p-3)n+k$, $(4p-2)n+k$ and $(4p-1)n+k$ (where k=1, 2 ... n, and p=1, 2 ... m), $((4p-4)n+k)$th and $((4p-2)n+k)$th samplings are in phase and $((4p-3)n+k)$th and $((4p-1)n+k)$th samplings are in phase and are 180° out of phase with the $((4p-4)n+k)$th and $((4p-2)n+k)$th samplings;

(b) each of portions for forming directly picture elements of said m horizontal scanning electrodes includes a center portion in the shape of a rectangle having a width of W and a length of L; said length of L is divided by 2n to make 2n divisions of said center portion, each of said portions for forming directly picture elements further includes n upper projections each having a length of L/2n and a width of W/3 and extending upwards from the respective center portion divisions in odd numbers counted in a direction of said L from one end of said each horizontal scanning electrode; and n lower projections each having a length of L/2n and a width of W/3 and extending downwards

TABLE 1

| Comparison of Performance of Each Driving System | | | | |
|---|---|---|---|---|
| | Simple matrix | Double matrix | Prior art quadruplex matrix | Revised quadruplex matrix |
| Signal electrodes | n = 160 | 2n = 320 | 4n = 640 | 4n = 640 |
| Scanning electrodes | m = 224 | m/2 = 112 | m/4 = 56 | m/4 = 56 |
| Duty ratio | 1/m = 1/224 | 2/m = 1/112 | 4/m = 1/56 | 4/m = 1/56 |
| Vertical resolution | 224 | 224 | 224 | 224 |
| Horizontal resolution | 160 | 160 | 160 | 320 |
| Total of picture elements | 35840 (160 × 224 × 1) | 35840 (160 × 112 × 2) | 35840 (116 × 56 × 4) | 35840 (160 × 2) |
| Horizontal leads | 0 | 160 (160 × 1) | 480 (160 × 3) | 320 (160 × 2) |
| Aperture ratio | Maximum | High | Low | Between double matrix and prior art quadruplex matrix |
| Arrangement of picture elements |  |  |  | 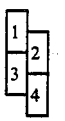 |
| Sampling timing | 1,2,3,4 = same phase | 1,2,3,4 = same phase | 1,2,3,4 = same phase | 1,3 = same phase 2,4 = delayed by p/2 |

What is claimed is:

1. A quadruplex matrix type liquid crystal display device in which sampling holds are taken with a frequency of n times with respect to each of 4m picture signals necessary for a one-field picture display where n from the respective center portion divisions in even numbers;

(c) each of portions for forming directly picture elements of said 4n signal electrodes is shaped so that along a width of 4Wm/3, electrodes for producing m picture elements each having a length of L/2n and a width of 2W/3 are coupled by means of leads; and (d) a region made by adding the width (W/3) of the upper projection of each of said scanning electrodes to the width (W) of the center portion which exists on a lower part of said upper projection is vertically divided into two equal parts, the upper part and the lower part of the two equally divided parts of each scanning electrode are called a first position and a third position respectively of the scanning electrode, and also a region made by adding the width (W/3) of the lower projection of each of the scanning electrodes to the width (W) of the center portion which exists]on an upper part of the lower projection is vertically divided into two equal parts, the upper part and the lower part of the two equally divided parts are called a second position and a fourth position respectively of the saanning electrode, and furthermore, the positions of each of the signal electrodes opposite to the corresponding positions of each of said scanning electrodes are also called said first position, said third position, said second position and said foutth position of the signal electrode, said $((4p-4)n+k)$th sampling data are given into said first position of the signal electrode, said $((4p-3)n+k)$th sampling data are given into said second position of the signal electrode, said $((4p-2)n+k)$th sampling data are given into said third position of the signal electrode and said $((4p-1)n+k)$th sampling data are given into said fourth position of the signal electrode.

* * * * *